US008724947B2

(12) United States Patent
Bohler et al.

(10) Patent No.: US 8,724,947 B2
(45) Date of Patent: May 13, 2014

(54) ARMORED FIBER OPTIC ASSEMBLIES AND METHODS OF FORMING FIBER OPTIC ASSEMBLIES

(71) Applicant: Corning Cable Systems LLC, Hickory, NC (US)

(72) Inventors: Gregory Blake Bohler, Lenoir, NC (US); Julian Latelle Greenwood, III, Hickory, NC (US); Keith Aaron Greer, Morganton, NC (US); Wesley Brian Nicholson, Hickory, NC (US); James Arthur Register, III, Hickory, NC (US); Kimberly Dawn Slan, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/900,703

(22) Filed: May 23, 2013

(65) Prior Publication Data
US 2013/0259435 A1 Oct. 3, 2013

Related U.S. Application Data

(63) Continuation of application No. 12/748,925, filed on Mar. 29, 2010, now Pat. No. 8,463,095.

(60) Provisional application No. 61/168,005, filed on Apr. 9, 2009.

(51) Int. Cl.
G02B 6/44 (2006.01)
(52) U.S. Cl.
USPC ........... 385/107; 385/100; 385/102; 385/109; 385/111

(58) Field of Classification Search
CPC .... G02B 6/4432; G02B 6/4429; G02B 6/443; G02B 6/4495
USPC .......................... 385/100, 102, 107, 109, 111
See application file for complete search history.

(56) References Cited

U.S. PATENT DOCUMENTS

| 4,514,036 A | 4/1985 | McDonald |
| 4,743,085 A | 5/1988 | Jenkins et al. |
| 4,814,133 A | 3/1989 | Matsuno et al. |

(Continued)

FOREIGN PATENT DOCUMENTS

| CN | 87103827 A | 4/1988 |
| JP | 11223752 A | 8/1999 |
| WO | 9309457 A1 | 5/1993 |
| WO | 9535196 A1 | 12/1995 |

OTHER PUBLICATIONS

First Office Action for Chinese patent application 201010146116.8 mailed Nov. 12, 2012, 5 pages.

(Continued)

*Primary Examiner* — Jennifer Doan
(74) *Attorney, Agent, or Firm* — Russell S. Magaziner

(57) ABSTRACT

Cables have armor including a polymer, the armor having an armor profile that resembles conventional metal armored cable. The armor provides additional crush and impact resistance for the optical fibers and/or fiber optic assembly therein. The armored cables recover substantially from deformation caused by crush loads. Additionally, the armored fiber optic assemblies can have any suitable flame and/or smoke rating for meeting the requirements of the intended space.

20 Claims, 8 Drawing Sheets

(56) References Cited

U.S. PATENT DOCUMENTS

| | | | |
|---|---|---|---|
| 4,946,237 A | 8/1990 | Arroyo et al. | |
| 5,126,167 A | 6/1992 | Matsuno et al. | |
| 5,305,411 A | 4/1994 | Arroyo | |
| 5,615,293 A | 3/1997 | Sayegh | |
| 5,892,873 A | 4/1999 | Tatat | |
| 5,920,671 A | 7/1999 | Smith | |
| 6,233,384 B1 | 5/2001 | Sowell, III et al. | |
| 6,636,673 B2 | 10/2003 | Register, III et al. | |
| 6,898,354 B2 | 5/2005 | Kim et al. | |
| 6,906,264 B1 | 6/2005 | Grant, Jr. et al. | |
| 6,909,264 B2 | 6/2005 | Del Gatto et al. | |
| 7,025,509 B2 | 4/2006 | Martin | |
| 7,064,276 B2 | 6/2006 | Sakabe et al. | |
| 7,196,272 B2 | 3/2007 | Glew | |
| 7,202,418 B2 | 4/2007 | Glew | |
| 7,266,886 B2 | 9/2007 | Estienne et al. | |
| 7,313,304 B2 | 12/2007 | Andrews et al. | |
| 7,336,873 B2 | 2/2008 | Lail et al. | |
| 7,415,181 B2 * | 8/2008 | Greenwood et al. | 385/100 |
| 7,844,148 B2 | 11/2010 | Jenkins et al. | |
| 7,845,069 B2 | 12/2010 | Franklin et al. | |
| 8,218,925 B2 | 7/2012 | Bohler et al. | |
| 8,331,748 B2 | 12/2012 | Register, III | |
| 8,639,075 B1 * | 1/2014 | Burnett | 385/107 |
| 2001/0007604 A1 | 7/2001 | Lail | |
| 2003/0161596 A1 | 8/2003 | Register, III et al. | |
| 2003/0202756 A1 | 10/2003 | Hurley et al. | |
| 2004/0120663 A1 | 6/2004 | Lail et al. | |
| 2005/0013573 A1 | 1/2005 | Lochkovic et al. | |
| 2005/0098342 A1 | 5/2005 | Sakabe et al. | |
| 2005/0196113 A1 | 9/2005 | Hurley et al. | |
| 2006/0029340 A1 | 2/2006 | Andrews et al. | |
| 2006/0280413 A1 | 12/2006 | Paschal et al. | |
| 2008/0253723 A1 | 10/2008 | Stokes et al. | |
| 2009/0139084 A1 | 6/2009 | Franklin et al. | |
| 2010/0260459 A1 | 10/2010 | Bohler et al. | |
| 2010/0278492 A1 | 11/2010 | Bohler et al. | |
| 2011/0262087 A1 | 10/2011 | Bohler et al. | |
| 2012/0251061 A1 | 10/2012 | Bohler et al. | |

OTHER PUBLICATIONS

Second Office Action for Chinese patent application 200910209613.5 mailed May 13, 2013, 7 pages.
First Office Action for Chinese patent application 200910209613.5 mailed Aug. 31, 2012, 7 pages.
Advisory Action for U.S. Appl. No. 12/768,158 mailed Nov. 6, 2012, 4 pages.
Final Office Action for U.S. Appl. No. 12/768,158 mailed Aug. 16, 2012, 18 pages.
Non-Final Office Action for U.S. Appl. No. 12/768,158 mailed Jan. 5, 2012, 17 pages.
Non-Final Office Action for U.S. Appl. No. 12/718,044 mailed Jan. 6, 2012, 11 pages.
Notice of Allowance for U.S. Appl. No. 12/718,044 mailed Apr. 6, 2012, 8 pages.
Non-Final Office Action for U.S. Appl. No. 12/261,645 mailed Oct. 6, 2009, 12 pages.
Notice of Allowance for U.S. Appl. No. 12/261,645 mailed Feb. 12, 2010, 7 pages.
Restriction Requirement for U.S. Appl. No. 12/261,645 mailed Jun. 26, 2009, 9 pages.
Non-Final Office Action for U.S. Appl. No. 12/748,925 mailed Jul. 24, 2012, 12 pages.
Notice of Allowance for U.S. Appl. No. 12/748,925 mailed Nov. 27, 2012, 9 pages.
Restriction Requirement for U.S. Appl. No. 12/748,925 mailed Apr. 27, 2012, 6 pages.
Notice of Allowance for U.S. Appl. No. 12/888,865 mailed Sep. 19, 2012, 8 pages.
Non-Final Office Action for U.S. Appl. No. 13/673,203 mailed Feb. 1, 2013, 9 pages.
Non-final Office Action for U.S. Appl. No. 13/494,129 mailed Aug. 16, 2012, 7 pages.
Notice of Allowance for U.S. Appl. No. 13/494,129 mailed Oct. 29, 2012, 9 pages.
Non-final Office Action for U.S. Appl. No. 13/866,678 mailed Jul. 11, 2013, 11 pages.

* cited by examiner

ARMORED FIBER OPTIC ASSEMBLIES AND METHODS OF FORMING FIBER OPTIC ASSEMBLIES

PRIORITY APPLICATION

This application is a continuation of U.S. application Ser. No. 12/748,925 filed on Mar. 29, 2010, which claims the benefit of U.S. Application No. 61/168,005 filed on Apr. 9, 2009, the content of which is relied upon and incorporated herein by reference in its entirety.

RELATED APPLICATIONS

This application is related to U.S. application Ser. No. 12/261,645, filed Oct. 30, 2008, the entire contents of which are hereby incorporated by reference. This application is also related to U.S. Prov. App. 61/174,059, filed Apr. 30, 2009.

TECHNICAL FIELD

The present disclosure relates generally to optical fiber assemblies, and in particular relates to armored fiber optic assemblies having polymeric armor.

BACKGROUND

Fiber optic cables and assemblies should preserve optical performance when deployed in the intended environment while also satisfying any other requirements for the environment. Indoor cables for riser and/or plenum spaces, for example, may require certain flame-retardant ratings as well as mechanical requirements. Mechanical characteristics such as crush performance, permissible bend radii, and temperature performance in part determine how installation and use of the cable in the installation space affect optical performance of the cable.

Certain conventional indoor riser applications use a fiber optic cable disposed within a metallic interlocking armor layer. "BX armor" or "Type AC" cables utilize such armors. BX armor is wound spirally about the fiber optic cable so that the edges of the adjacent wraps of armor mechanically interlock to form an armor layer. Interlocking armors are robust but expensive to install. In particular, the metallic armor must be electrically grounded in order to meet safety standards. FIG. 1 shows several prior art examples of interlocking armored cables 10 having a metallic (typically aluminum) armor layer 12. The metallic armor layer 12 must be grounded, for example, in order to comply with the National Electrical Code (NFPA 120) safety standard. Additionally, the metallic armor 12 can be plastically deformed (i.e., permanently deformed) under crush loads, which can pinch the cable and cause permanently elevated levels of optical attenuation that remain after the crush load is released.

Manufacturers have attempted to design dielectric armor cables to overcome the drawbacks of conventional metallic armor constructions. U.S. Pat. No. 7,064,276 discloses a dielectric armor cable having two synthetic resin layers where the hard resin layer has a continuous spiral groove cut completely through the hard resin layer along the length of the armor. The hard adjoining edge portions of the spiral groove abut to inhibit bending below a certain radius. However, one skilled in the art would recognize this design does not provide the craft with all of the desired features. Moreover, it can be difficult for the craft to recognize the cable of U.S. Pat. No. 7,064,276 as an armored cable layered because it has a smooth outer surface, whereas conventional metal armored cables as depicted by FIG. 1 are easily identified by the craft.

SUMMARY

The disclosure is directed to armored fiber optic assemblies having a dielectric armor and methods for manufacturing cables having dielectric armor. The dielectric armor can have an armor profile resembling conventional metal armored cable. The dielectric armor provides crush and impact resistance to the optical fibers and/or fiber optic assembl(ies) therein. After being subjected to crush loads, the dielectric armor recovers to substantially recover or to wholly recover its original shape. The dielectric armor is also advantageous in that it provides desired mechanical performance without requiring the time and expense of grounding during installation.

According to one aspect, when the dielectric armor is subjected to a crush load along a crush direction that reduces a crush dimension of the assembly from its original outside diameter to less than 62 percent of the outside diameter, the cable assembly recovers when the crush load is released so that the crush dimension increases to at least 70 percent of the outside diameter, and even as high as at least 74 percent of the outside diameter.

According to another aspect, when the dielectric armor is subjected to a crush load along a crush direction that reduces a crush dimension of the assembly from its original outside diameter to less than 58 percent of the outside diameter, the cable assembly recovers when the crush load is released so that the crush dimension increases to at least 70 percent of the outside diameter.

According to another aspect of the present embodiments, the armored fiber optic assemblies can have suitable flame and/or smoke ratings for spaces such as plenum and riser applications.

According to another aspect, a method of crush testing armored fiber optic assemblies comprises: providing an armored fiber optic assembly comprising a fiber optic assembly having at least one optical fiber and a dielectric armor surrounding the fiber optic assembly; measuring an outside diameter of the armored fiber optic assembly; subjecting the armored fiber optic assembly to a crush load along a crush direction; releasing the crush load; allowing the armored fiber optic assembly to recover; and measuring a height of the armored fiber optic assembly along the crush direction.

It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The accompanying drawings are included to provide further understanding of the invention. The drawings illustrate the various example embodiments of the invention and, together with the description, serve to explain the principals and operations of the invention.

DETAILED DESCRIPTION

Figure 1:
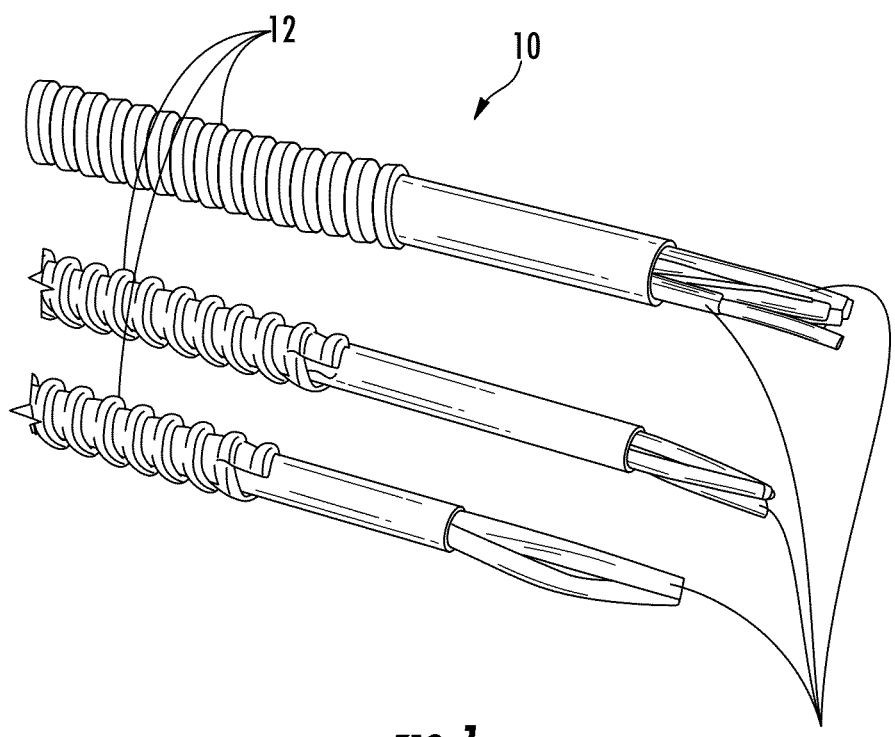
FIG. 1 is a perspective view of three different prior art interlocking armor cables.

Reference is now made in detail to exemplary embodiments of the invention, examples of which are illustrated in the accompanying drawings. Whenever possible, identical or similar reference numerals are used throughout the drawings to refer to identical or similar parts.

Figure 2:
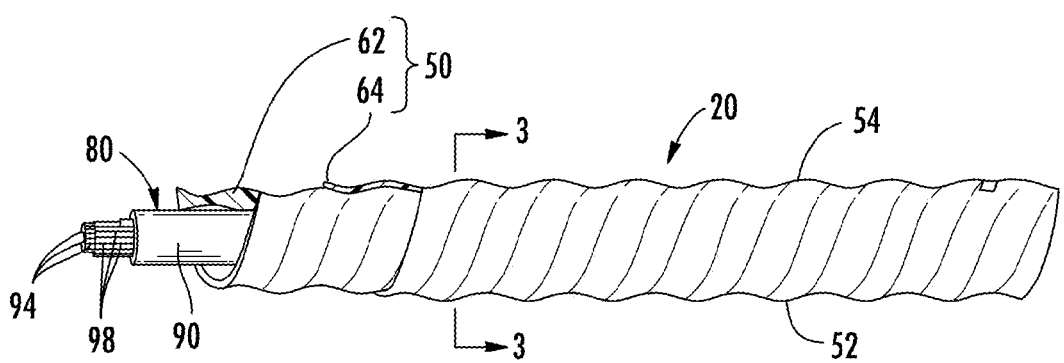
FIG. 2 is a side cut-away view of a first example embodiment of an armored fiber optic assembly having a dielectric armor.

FIG. 2 is a side cut-away view of an armored fiber optic assembly 20 having at least one optical fiber 40 disposed within a dielectric armor 50. The dielectric armor 50 is non-conductive and has an outer surface 52 that includes an armor profile 54 generally formed in a spiral along a longitudinal axis. As used herein, "armor profile" means that the outer surface has an undulating surface along its length that looks similar to conventional metal armors (i.e., a undulating shape along the length of the armor). The armor profile could also be formed by a series of spaced rings. The dielectric armor 50 is advantageous in that it both provides crush resistance and recovers to assume its original shape when subjected to crush loads. The dielectric armor 50 may also meet flame and/or smoke ratings, and does not require electrical grounding.

The dielectric armor 50 includes one or more layers such as an inner layer 62 and an outer layer 64, but other constructions are possible. The outer layer 64 can be referred to as a "jacket" layer. The dielectric armor 50 may alternatively consist of a single layer such as the inner layer 62.

Preferably, the inner layer 62 is a rigid material and the outer jacket layer 64 is a non-rigid material. It is also possible to use a non-rigid material for the inner layer 62 and to use a rigid material for the outer layer 64. As used herein, "rigid material" means the material has a Shore D hardness of about 65 or greater and "non-rigid material" means the material has a Shore D hardness of about 64 or less. In general the inner layer 62 will be of a more rigid material than the outer jacket layer 64, or stated alternatively, the Shore D hardness of the inner layer 62 will be greater than the Shore D hardness of the outer jacket layer 64. FIG. 2 depicts a dielectric armor 50 having multiple layers with the armor profile formed essentially in the rigid inner layer 62 and in the non-rigid outer layer 64—the outer layer having an essentially uniform thickness over inner layer 62.

Still referring to FIG. 2, a fiber optic assembly 80 is housed within and protected by the dielectric armor 50. In the illustrated embodiment, the fiber optic assembly 80 is a fiber optic cable having an extruded polymer cable jacket 90 and a plurality of tight-buffered optical fibers 94 extending longitudinally through the assembly 20 within the cable jacket 90. Strength elements 98, such as aramid fibers, also extend longitudinally through the cable jacket 90. In one embodiment, the cable jacket 90 can be omitted. By way of example, the fiber optic assembly 80 may be a stranded tube cable, monotube cable, micromodule cable, slotted core cable, loose fibers, tube assemblies, or the like. Additionally, fiber optic assemblies according to the present embodiments can include any suitable components such as water-blocking or water-swelling components, flame-retardant components such as tapes, coatings, or other suitable components. The fiber optic assembly 80 may have any suitable fiber count such as 6, 12 or 24-fiber MIC® cables available from Corning Cable Systems of Hickory, N.C.

In the illustrated embodiment, the inner layer 62 has a "continuous annular cross-section". As used herein, "continuous annular cross-section" means there are no spiral grooves, openings, or slits that cut entirely through (i.e., from the inner surface to the outer surface 52) the layer 62. The exemplary outer layer 64 is formed from a non-rigid material that provides impact protection, recoverability after crush loading, and can also have low-smoke characteristic and/or flame-retardant properties, as discussed in further detail below. The outer layer 64 may also have a continuous annular cross-section.

Figure 3:
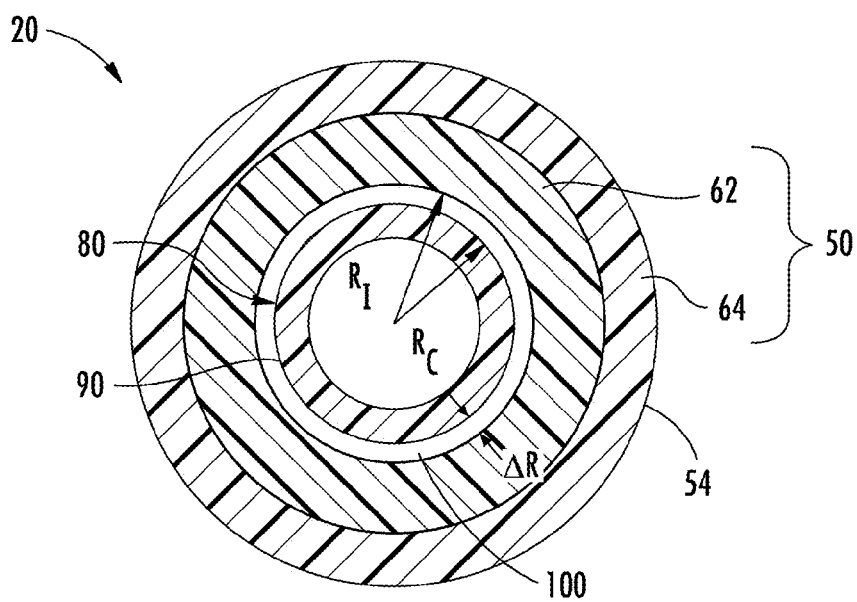
FIG. 3 is a partial cross-section of the armored fiber optic assembly of FIG. 2 taken along the line 3-3.

FIG. 3 is a partial cross-sectional view of the armored fiber optic assembly 20 of FIG. 2 taken along the line 3-3. In FIG. 3, the optical fibers 94 and the strength members 98 are omitted so that certain dimensions of the assembly 20 can be illustrated. For the purposes of simplicity in illustration, the dielectric armor 50 is depicted with a uniform circular cross-section that does not reflect the spiral of the armor profile.

As shown in FIG. 3, the fiber optic assembly 80 has an outer radius $R_C$ and the dielectric armor 50 has an inner radius $R_I$. The assembly 20 can include a free space 100 disposed between the outer surface of the fiber optic assembly 80 and the inner surface of the dielectric armor 50 generally represented by a separation $\Delta R$. While the separation $\Delta R$ between the cable jacket 90 and the armor 50 inner surface is shown as uniform around the jacket circumference, it will in fact vary along the length of the fiber optic assembly 20, and the cable jacket 90 and the armor 50 will actually contact one another at numerous points. An average or median separation $\Delta R$ can therefore be calculated as $\Delta R = R_I - R_C$. The presence of the free space 100 improves optical performance during crush events and the like as discussed below. By way of example, the average free space separation $\Delta R$ is typically about 2 millimeters or less, but free space separation $\Delta R$ values larger than 2 millimeters are possible. In one embodiment, the free space separation $\Delta R$ is between 0.1-1.5 millimeters. In a second embodiment, the free space separation $\Delta R$ is in the range of 0.4-0.6 millimeters.

Mechanical characteristics used in designing the armored fiber optic assembly 20 include minimum bend radius, impact resistance, crush-resistance, tensile strength, durability of the dielectric armor, susceptibility to plastic deformation, the ability to recover from crush loads, etc. Material characteristics such as the hardness, modulus, etc., along with geometry influence the desired characteristics/optical performance for the armored fiber optic assembly 20. For instance, the inner layer 62 and/or the outer layer 64 of the armor 50 should have a suitable modulus of elasticity. By way of example, a modulus of elasticity at 1% strain for the rigid material (the inner layer 62 in the illustrated embodiment) is about 1200 MPa or greater and the modulus of elasticity at 1% strain for the non-rigid material (the outer layer 64 in the illustrated embodiment) is in the range of 300-1200 MPa. These are merely explanatory examples and other values for the modulus of elasticity are possible with the concepts disclosed herein.

Example 1

A fiber optic assembly as illustrated in FIG. 2 has an overall average outside diameter of about 10.4 mm, allowing for some ovality in the cross-section, an average outer layer 64 thickness of about 1.0 mm, an average inner layer 62 thickness in the range of about 1.1-1.2 mm, a cable jacket 90 thickness of about 0.5 mm, an assembly 80 outside diameter of about 5.6 mm, and a median separation ΔR in the range of about 0.3-0.6 mm. The cable jacket 90 and the outer layer 64 are made from AlphaGary SG III 1070L, and the inner layer 62 is made from Teknor Apex flame retarded rigid PVC available under the designation FG RE 8015B. The fiber optic assembly 80 included 12 optical fibers of flame retarded tight-buffered fibers. The armored fiber optic assembly 20 had a weight of about 99.1 kilogram per kilometer, with the fiber optic assembly 80 accounting for about 32.2 kilogram per kilometer, and the inner layer 62 of the armor 50 accounting for about 36.1 kilogram per kilometer.

Example 2

A fiber optic assembly as illustrated in FIG. 2 has an overall average outside diameter of about 11.3 mm, allowing for some ovality of the cross-section, an average outer layer 64 thickness of 1.0 mm, an average inner layer 62 thickness in the range of about 1.1-1.2 mm, a cable jacket 90 thickness of about 0.5 mm, an assembly 80 outside diameter of about 6.8 mm, and a median separation ΔR in the range of about 0.3-0.6 mm The cable jacket 90 and the outer layer 64 are made from AlphaGary SG III 1070L, and the inner layer 62 is made from Teknor Apex flame retarded rigid PVC available under the designation FG RE 8015B. The fiber optic assembly 80 included 24 optical fibers of flame retarded tight-buffered fibers. The armored fiber optic assembly 20 had a weight of about 145.1 kilogram per kilometer, with the fiber optic assembly 80 accounting for about 56.0 kilogram per kilometer, and the inner layer 62 of the armor 50 accounting for about 52.1 kilogram per kilometer.

Example 3

A plenum rated fiber optic assembly as illustrated in FIG. 2 has an overall average outside diameter of about 10.6 mm, allowing for some ovality in the cross-section, an average outer layer 64 thickness of about 1.2 mm, an average inner layer 62 thickness in the range of about 1.1-1.2 mm, a cable jacket 90 thickness of about 0.5 mm, an assembly 80 outside diameter of about 5.2 mm, and a median separation ΔR in the range of about 0.3-0.6 mm The cable jacket 90 and the outer layer 64 are made from AlphaGary SG III 1070L, and the inner layer 62 is made from Teknor Apex flame retarded rigid PVC available under the designation FG RE 8015D. The fiber optic assembly 80 includes 12 optical fibers of flame retarded tight-buffered fibers. The armored fiber optic assembly 20 has a weight of about 138.7 kilogram per kilometer, with the fiber optic assembly 80 accounting for about 27.4 kilogram per kilometer, and the inner layer 62 of the armor 50 accounting for about 35.6 kilogram per kilometer.

Example 4

A plenum rated fiber optic assembly as illustrated in FIG. 2 has an overall average outside diameter of about 13.2 mm, allowing for some ovality of the cross-section, an average outer layer 64 thickness of 1.5 mm, an average inner layer 62 thickness in the range of about 1.3-1.4 mm, a cable jacket 90 thickness of about 0.5 mm, an assembly 80 outside diameter of about 6.65 mm, and a median separation ΔR in the range of about 0.3-0.6 mm. The cable jacket 90 and the outer layer 64 are made from AlphaGary SG III 1070L, and the inner layer 62 is made from Teknor Apex flame retarded rigid PVC available under the designation FG RE 8015D. The fiber optic assembly 80 includes 24 optical fibers of flame retarded tight-buffered fibers. The armored fiber optic assembly 20 has a weight of about 189.2 kilogram per kilometer, with the fiber optic assembly 80 accounting for about 45.5 kilogram per kilometer, and the inner layer 62 of the armor 50 accounting for about 52.7 kilogram per kilometer.

Figure 4:
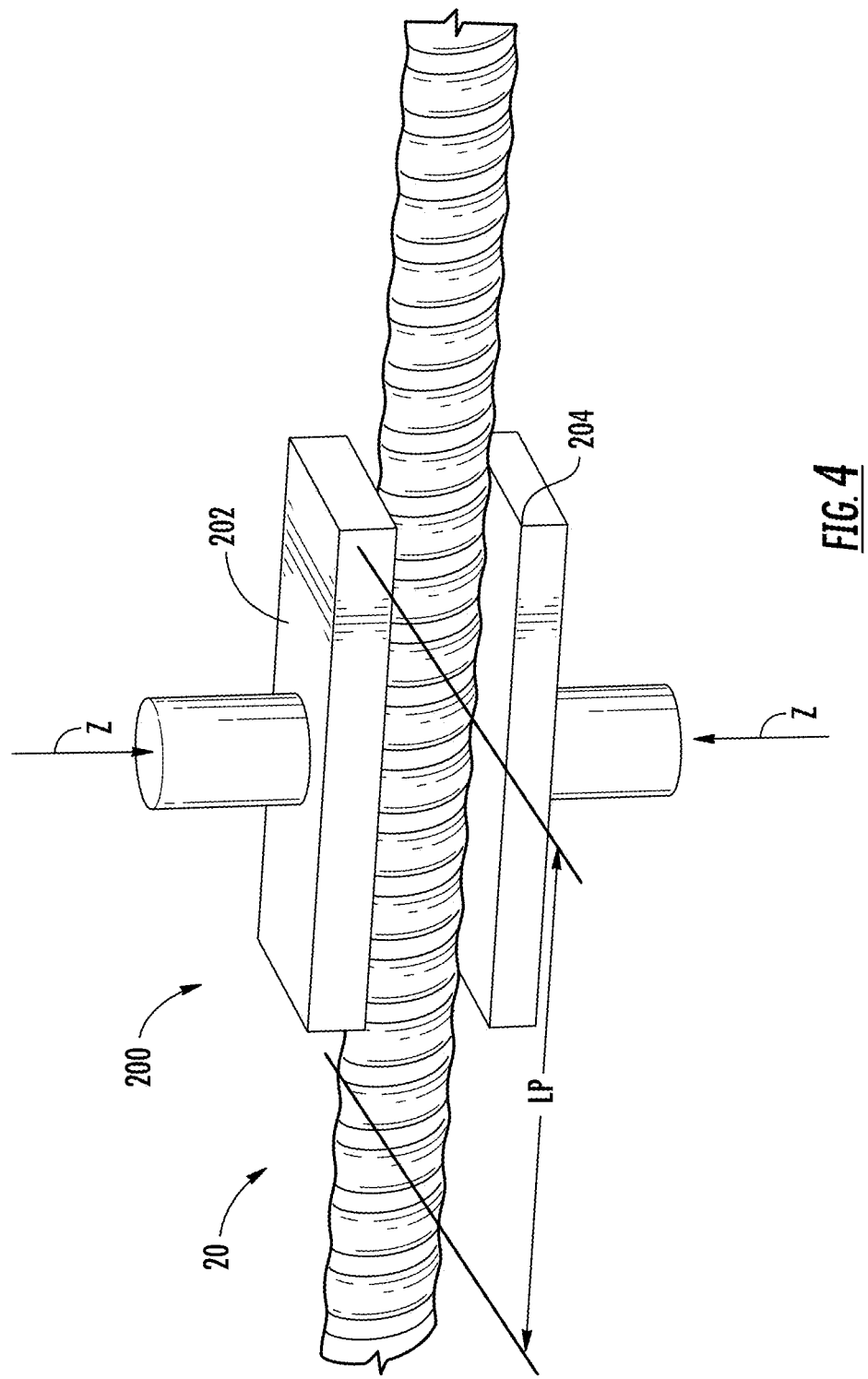
FIG. 4 illustrates a test apparatus for applying crush loads to fiber optic assemblies.

One mechanical property provided by the dielectric armor 50 is its resistance to crush under loads. FIG. 4 illustrates the fiber optic assembly 20 under crush load testing in a test apparatus 200. The test apparatus 200 includes two rigid plates 202, 204 of 10 centimeter length LP in FIG. 4. The plates 202, 204 are configured to exert compressive loads at a mid-span section of a cable. Edges of the plates 202, 204 can be rounded so that the plates do not cut into the surface of the assembly 20. The test apparatus 200 can be used to test, for example, the ability of the fiber optic assembly 20 to recover its original shape after being subjected to crush loads. While the load required to deflect the dielectric armor 50 generally is lower than metallic BX-type armors, the deformation is not as severe, and most or all of the attenuation in optical signals conveyed by the assembly 20 is relieved after removing the test load. By contrast, metallic armors deform plastically, so that they may recover little, if at all, after removing a test load. The elastic properties of the rigid dielectric material for inner layer 62 allow the armor 50 to recover generally to its original shape after crush or impact.

For rigid PVC materials, such as Teknor Apex materials FG RE 8015A, 8015B and 8015D, the elastic region along the stress/strain curve defines where the dielectric armor will return to its original shape. The elastic deformation region of the dielectric armor 50 is defined on a stress/strain curve generated from a flexural modulus test. If the elastic region is exceeded, the dielectric armor 50 yields (or plastically deforms) 180 degrees apart and may recover to an oval shape. According to one aspect of the present embodiments, the dielectric armor cable 50 has superior resistance to crush loads. According to a further aspect, even if a crush rating, such as ICEA S-83-596-2001, is exceeded, the fiber optic assembly 20 significantly or substantially wholly recovers its original shape after removal of the crush load. ICEA S-83-596-2001 covers fiber optic communications cables intended for use in buildings. Cables according to the present embodiments can also be designed to recover after testing under ICEA S-104-696, which covers fiber optic communications cables intended for indoor and outdoor use, and testing under ICEA S-87-640, which covers fiber optic communications cables intended for outdoor use.

Crush testing may cause unacceptable optical attenuation in the optical fibers 94. According to another aspect of the present embodiments, under the described test conditions, assuming none of the optical fibers 94 are damaged, attenuation caused by the crush load is relieved when the crush load is removed. By contrast, if a BX cable crush/impact rating is exceeded and the armor plastically deforms, the cable typically remains pinched resulting in a permanent attenuation step in the cable.

Fiber optic assemblies as described in Example 1 (12 fiber), and Example 2 (24 fiber) were subjected to crush testing under extremely high loads in an apparatus as generally depicted in FIG. 4. Table A listed below summarizes the results for crush testing for the exemplary assembly described in Example 1 (12 fiber count cable). Table B listed below summarizes the results for crush testing for the assembly described in Example 2 (24 fiber count cable). The test procedure and results are discussed below.

Referring to FIG. 4 and to Tables A and B, the crush test loads (Newtons), were applied over an axial length LP of 10 centimeters. Several different Locations along the length of the two assemblies were crush tested. The opposed plates 202, 204 applied crush loads in the "z" or "crush" direction, which was aligned with an initial, pre-crush outside diameter at each location of the assembly. In Tables A and B, average, pre-crush outside diameters of the assemblies are used for comparison purposes because the assemblies may have some degree of ovality in cross-section. The test began by advancing the plates 202, 204 together in the z-direction to apply an initial crush load to the assemblies. The initial load compressed the assembly in Table A to an initial crush height of about 10.11 mm, and the assembly of Table B to an initial crush height of 10.8 mm. The height of the compressed assembly is assumed to be the spacing of the plates 202, 204 during crush testing. The initial crush load is applied to generally align peaks on the assembly profile between the plates 202, 204.

The crush load was then increased to the Maximum Force (Newtons). The Maximum Force corresponded to the maximum force that could be generated by the test apparatus 200, which fell in the range of about 8,000 N. At this time, the armored cable assembly was pressed between the plates 202, 204 at the Plate Spacing at Maximum Crush (mm) The armored assembly was held at that load for 10 minutes. The Percent of Outside Diameter at Crush percentages reflect the Plate Spacing at Maximum Crush values divided by the pre-crush Outside Diameter of the assembly. This calculation indicates the degree to which the assembly was crushed from its pre-crush state. The test crush load was then released and the assembly was allowed to recover for five minutes. The Cable Dimension After Recovery, now reduced in height from the original Outside Diameter, was then measured in the crush or z-direction. The Percent of Outside Diameter After Recovery percentages reflect the Cable Dimension After Recovery values divided by the pre-crush Outside Diameter of the assembly.

TABLE A

Crush Performance Testing - 12 Fiber Assembly with 10.4 mm Pre-Crush Outside Diameter

| Location | Plate Spacing at Maximum Crush (mm) | Maximum Force (Newton) | % of Outside Dia. at Crush | Cable Dim. After Recovery (mm) | % of Outside Dia. After Recovery |
|---|---|---|---|---|---|
| 1 | 6.38 | 8024 | 61.3% | 7.78 | 74.8% |
| 2 | 5.75 | 8011 | 55.3% | 7.94 | 76.3% |
| 3 | 5.52 | 8064 | 53.1% | 7.33 | 70.5% |

TABLE B

Crush Performance Testing - 24 Fiber Assembly with 11.3 mm Pre-Crush Outside Diameter

| Location | Plate Spacing at Maximum Crush (mm) | Maximum Force (Newton) | % of Outside Dia. at Crush | Cable Dim. After Recovery (mm) | % of Outside Dia. After Recovery |
|---|---|---|---|---|---|
| 1 | 6.51 | 8020 | 57.6% | 9.39 | 83.1% |
| 2 | 6.37 | 8227 | 56.4% | 8.01 | 70.1% |
| 3 | 6.28 | 8033 | 55.6% | 8.24 | 72.9% |

The test data indicate that even after severe compression the tested assemblies recovered substantially along the crush dimension. For example, each of the 12 fiber assemblies in Table A experienced a reduction to less than 62% of the original Outside Diameter during Maximum Crush, yet recovered to have a dimension along the crush direction that was at least 70% of the Outside Diameter. Each of the 24 fiber assemblies in Table B experienced a reduction to less than 58% of the Outside Diameter during Maximum Crush, yet recovered to have a dimension along the crush direction that was at least 70% of the Outside Diameter. The 8000 Newton or greater loads applied to the tested assemblies were also extremely high when compared to conventional crush test standards. For example, under ICEA S-83-596-2001, a 100 Newton per centimeter of cable test load is applied. For a 10 centimeter section, as applied in present case, the total load would amount to only 1000 Newtons.

After crush testing, the assemblies were tested for optical attenuation and all had a delta attenuation of less than 0.4 decibels at 1550 nm.

Those skilled in the art will appreciate the difficulty in satisfying the required mechanical, low-smoke, and/or flame-retardant characteristics etc. for armored fiber optic assemblies.

The NFPA 262 plenum burn rating is especially stringent. The large combustible polymer mass of the armored fiber optic assemblies renders it difficult to meet both mechanical and flame/smoke requirements. Advantageously, certain embodiments of the armored fiber optic assemblies meet both the mechanical and the flame/smoke requirements such as riser-ratings and/or plenum-ratings. The cable described in Example 5 is expected to satisfy the ICEA S-83-596-2001 crush standard, and satisfies NFPA 262.

Example 5

A fiber optic assembly as generally illustrated in FIG. 2 has an average overall outside diameter of 13.1 mm, allowing for some ovality of cross-section, an outer layer 64 thickness of about 1.5 mm, an average inner layer 62 thickness of about 1.3 mm, a cable jacket 90 thickness of about 1.0 mm, an assembly 80 outside diameter of about 7.8 mm, and a median separation ΔR in the range of about 0.3-0.6 mm. The cable jacket 90 and the outer layer 64 are made from AlphaGary SG III 1070L, and the inner layer 62 is made from Teknor Apex flame retarded rigid PVC available under the designation Teknor Apex material FG RE 8015D. The fiber optic assembly 80 includes 24 tight-buffered optical fibers.

Mechanical and burn characteristics for the inner armor layer 62 are listed below in Table C. The inner layer 62 in Example 5 conforms with these properties.

TABLE C

Preferred Properties for Inner Armor Layer

| Material Characteristic | Min | Max |
|---|---|---|
| Tensile (psi) | 6,000 | — |
| Tensile Modulus (psi) | 300,000 | — |
| Elongation (%) | 100% | — |
| Flexural Modulus (psi) | 300,000 | — |
| LOI | 46 | — |
| Cone Calorimeter @ 75 kW/m2 (⅛" thick specimen) | | |
| Peak Smoke (1/m) | — | 1.5 |
| Peak Heat Release (kW/m$^2$) | — | 110 |
| Average Heat Release (kW/m$^2$) | — | 78 |
| Average Heat of Combustion (MJ/kg) | — | 9 |
| Total Heat Released | — | 65 |

Preferred mechanical and burn characteristics for the outer jacket layer 64 and the cable jacket layer 90 are listed below in Table D. The layers 64, 90 in Example 5 conform with these properties.

TABLE D

Preferred Properties for Jackets

| Core Jacket & Outer jacket Material Characteristic | Min | Max |
|---|---|---|
| Tensile (psi) | 2400 | — |
| Elongation (%) | 160% | — |

The PVC/PVC combination of Example 5 results not only in the desired flame-retardant riser rating, but also has the desired mechanical robustness for the rating.

The embodiments discussed above describe specific materials for assembly components to meet desired mechanical and burn characteristics. In general, if intended for indoor use, the armored fiber optic assembly 20 is flame-retardant and has a desired flame-retardant rating depending on the intended space, such as plenum-rated, riser-rated, general-purpose, low-smoke zero-halogen (LSZH), or the like. Suitable materials for the layers 62, 64 of the dielectric armor 50 may be selected from one or more of the following materials to meet the desired rating: polyvinyl chloride (PVC), polyvinylidene fluoride (PVDF), flame-retardant polyethylene (FRPE), chlorinated polyvinyl chloride (CPVC), polytetraflourethylene (PTFE), polyether-ether keytone (PEEK), Fiber-Reinforced Polymer (FRP), low-smoke zero-halogen (LSZH), polybutylene terephthalate (PBT), polycarbonate (PC), polyethylene (PE), polypropylene (PP), polyethylene terephthalate (PETE), and acrylonitrile-butadiene-styrene (ABS).

Another example of an armored fiber optic assembly similar to FIG. 2 and having a riser rating includes an inner layer 64 formed from a PVC available from Teknor Apex under the tradenames FG RE 8015A, 8015B and 8015D, and an outer layer 62 is formed from a plenum-grade PVC jacket material available from AlphaGary under the designation SG III 1070L. This PVC/PVC combination also meets the desired mechanical robustness for the rating ICEA S-83-596-2001.

An added advantage in the use of dielectric armor is the relatively low weight of the armor layer 62. As shown by Example 1, the 12 fiber dielectric armor assembly 20 has a weight of about 99.1 kg/km, and as shown in Example 3, a weight of 138.7 kg. As shown by Example 2, the 24 fiber dielectric armor assembly 20 has a weight of about 145.1 kg/km, and as shown by Example 4, a weight of 189 kg. In the present embodiments, the weight of the inner layer 62 of armor surrounding the fiber optic assembly can be less than 40% of the total weight of the armored cable assembly, and can even be as low as less than 30% of the total weight of the assembly.

Figure 5:
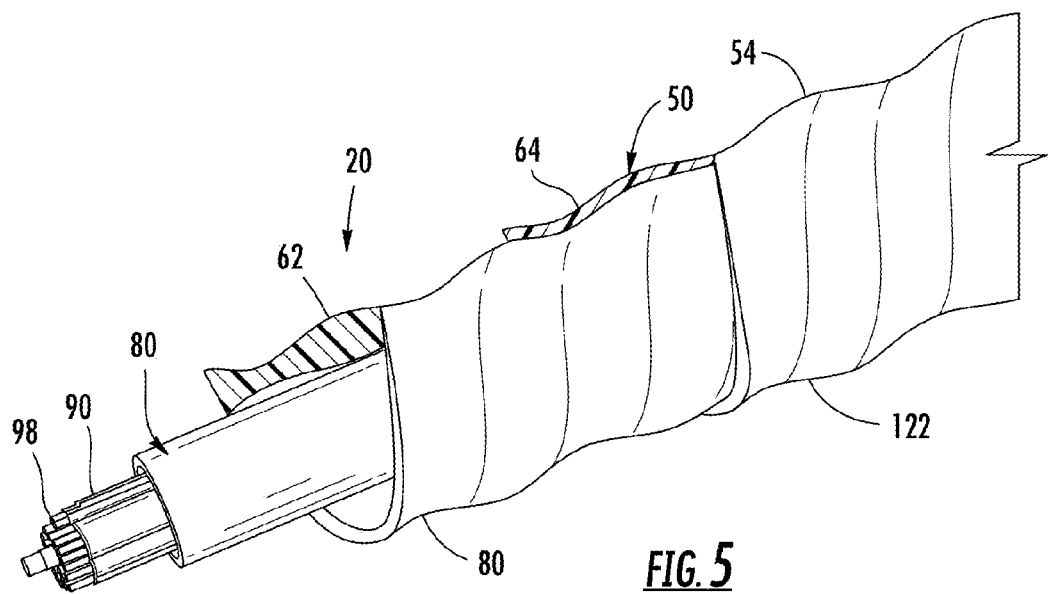
FIG. 5 is an enlarged perspective view and FIG. 6 is a close-up view of the armored fiber optic assembly of FIG. 2 showing a partial longitudinal cross-section of the dielectric armor superimposed on a grid for reference of the shapes of the layers.
Figure 6:
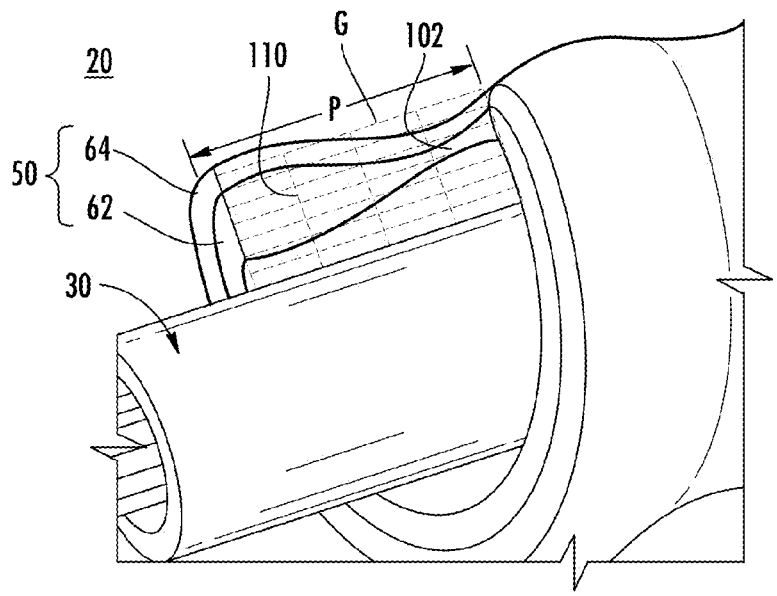

FIG. 5 is an enlarged partial cut-away perspective view and FIG. 6 is a close-up view of the armored fiber optic assembly 20 of FIG. 2. FIG. 6 illustrates a partial longitudinal cross-section of the dielectric armor 50 superimposed on a grid G for referencing the shapes of the layers. The armored profile 54 has a pitch P that includes a web 102 and a band 110. The pitch P describes a generally repeating shape that forms the armored profile in a spiral manner along the longitudinal axis of the assembly 20. The geometry of the armored profile 54 is discussed below in more detail with respect to finite-element modeling performed. As best shown in FIG. 6, the armored profile 54 of this embodiment is generally formed with inner layer 62 having a curvilinear profile formed in a spiral along the longitudinal axis and outer layer 64 has a generally uniform thickness formed over the curvilinear profile of inner layer 62. Two factors that influence the mechanical performance of the dielectric armor are geometry of the armored profile and the material characteristics of the layers.

Figure 7:
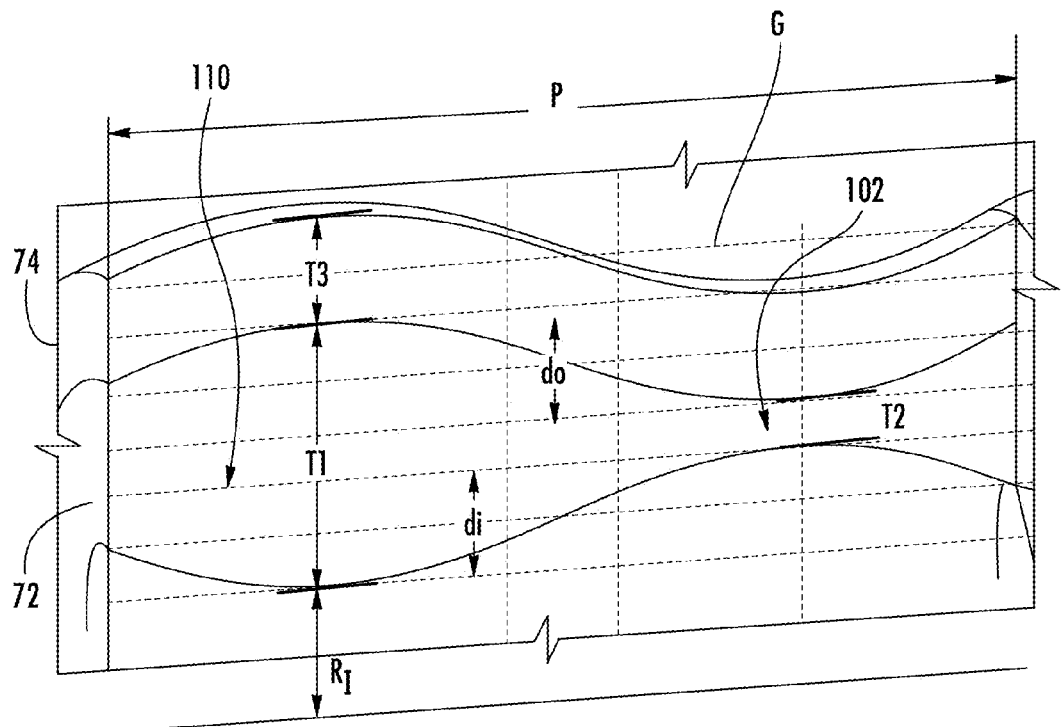
FIG. 7 is an enlarged view of a portion of the dielectric armor further showing various dimensions associated therewith.

FIG. 7 depicts an enlarged cross-sectional view of a portion of the dielectric armor 50 of FIG. 2 superimposed on grid G with certain dimensions of the armor profile shown. The dielectric armor is illustrated with a web 102 and a band 110. The inner layer 62 of the band 110 has a thickness T1 and the web 102 of the inner layer 62 has a thickness T2. On grid G, a web thickness T2 is defined as $T2=T1-d_O-d_I$, where an outer groove depth $d_O$ is the height difference between the band 110 and the web 102 of the inner layer 62, and an inner groove depth $d_I$ is the height difference between the band 110 and the web 102 of the inner layer 62. A total groove depth $d_O+d_I$ is the sum of the outer groove depth $d_O$ and inner groove depth $d_I$. In this illustration, the outer layer 64 has a thickness T3 that is essentially uniform along the length of the armor profile, but either or both of the layers could have the undulating armor profile. The dielectric armor 50 has an inner radius $R_I$ and an outer radius that is equal to $R_I+T_1$.

Figure 8:
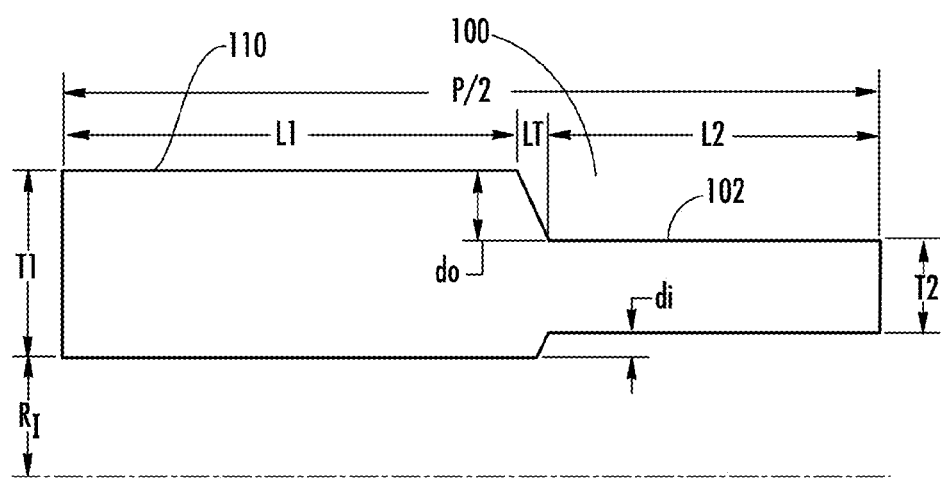
FIG. 8 is an enlarged perspective view of a portion of a generic armored profile showing the geometry used for finite-element modeling of the dielectric armor.

FIG. 8 is an enlarged perspective view of a portion of the layer of the dielectric armor 50 having the armor profile showing generic geometry/dimensions used for finite-element modeling of the armor. FIG. 8 depicts an armor profile that is shaped very closely to a step profile, which provides excellent mechanical characteristics when the proper geometry is selected. However, in practice it is difficult to manufacture the armor profile nearly as a step profile at relatively high line speeds as shown in FIG. 8. Consequently, manufactured dielectric armor has a rounded or sloped profile as shown in FIG. 7.

Finite-element analysis was conducted on the model of FIG. 8 to simulate the shape of manufactured profiles like shown in FIG. 7. Using finite-element analysis, the inventors discovered certain dimensions and/or relationships that provide desired mechanical characteristics for the armored profile. FIG. 8 depicts one-half pitch P/2 for the armored profile (i.e., the one-half pitch P/2 only depicts a fraction of the web 102 and a fraction of the band 110. The one-half pitch P/2 of the armor profile has a length given by the sum of length L1 (i.e., the fractional portion of the band), length $L_T$ (i.e., a transitional portion between the band and web), and length L2 (i.e., the fractional portion of the web). Additionally, for the purpose of simplicity only the layer with the armor profile of the dielectric armor was modeled since it contributes to the majority of the mechanical characteristics for the dielectric armor. Consequently, the web 102 has a length referred to as a groove length 2(L2) herein, which is two times the length L2.

Figure 9:
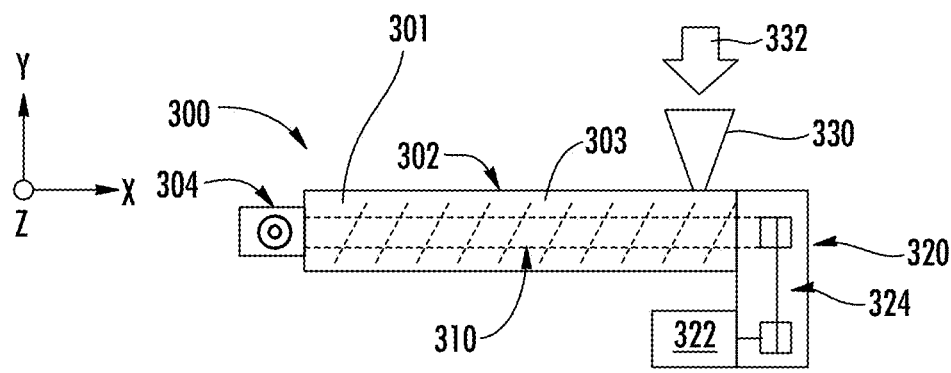
FIG. 9 is a schematic diagram of an explanatory extrusion system for making dielectric armor.

The dielectric armor 50 can be formed by extrusion. FIG. 9 depicts a schematic side view of an extrusion system 300 that includes an extruder 302 having an interior 301, with a barrel 303 and a screw 310 in the interior 301 and attached to a crosshead assembly ("crosshead") 304. X-Y-Z Cartesian coordinates are included for spatial reference, with FIG. 9 illustrated in the X-Y plane. The extruder 302 includes a screw 310 that is mechanically connected to and driven by a motor assembly 320. The motor assembly 320 includes a motor 322 and a drive system 324 that connects the motor to the screw 310. A material hopper 330 provides extrusion material 332—here, the dielectric material that ultimately makes up dielectric armor 50—to the extruder 302. U.S. Pat. No. 4,181,647 discloses an exemplary extrusion system that is suitable for adaptation for use as the extrusion system 300.

Figure 10:
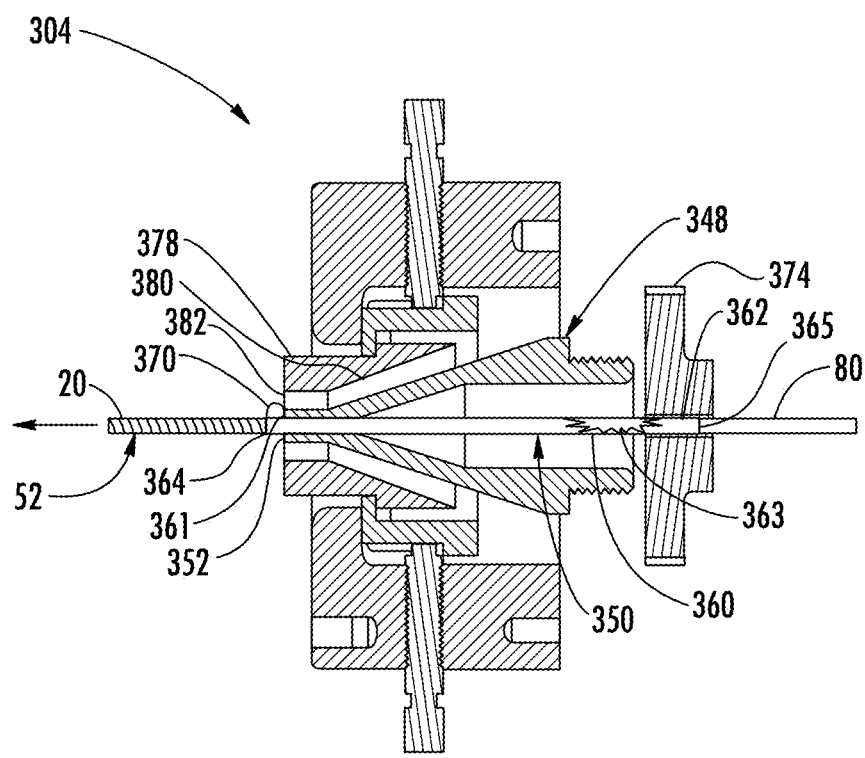
FIG. 10 is a schematic cross-sectional view of the crosshead of the extrusion system of FIG. 9.

FIG. 10 is a close-up, partial cross-sectional schematic view of an explanatory crosshead 304 as viewed in the Y-Z plane. The crosshead 304 includes a tip 348 having a central channel 350 with an output end 352 and in which is arranged a profile tube 360 having an outer surface 361, an inner surface 362 that defines a tube interior 363, a proximal (output) end 364, and a distal end 365. A profiling feature 370 is located on outer surface 361 at output end 352. In an example embodiment, the profiling feature 370 is a protrusion such as a nub or a bump. The profile tube interior 363 is sized to accommodate the fiber optic assembly 80 as it advances axially through the interior 363. The profile tube distal end 365 is centrally engaged by a gear 374 that, in turn, is driven by a motor (not shown) in a manner such that the profile tube 360 rotates within channel 350.

The crosshead 304 further includes a die 378 arranged relative to the tip 348 to form a cone-like material channel 380 that generally surrounds the central channel 350 and that has an output end 382 in the same plane as channel output end 352. The material channel 380 is connected to the extruder interior 301 so as to receive extrusion material 332 therefrom and through which flows the extrusion material during the extrusion process to form one or more layers of the dielectric armor. In the example embodiment of the crosshead 304 of FIG. 10, a profile tube output end 365 extends beyond the channel output end 352 such that the profiling feature 370 thereon resides adjacent material channel output end 382. In an example embodiment, the profile tube 360 and the tip 348 are integrated to form a unitary, one-piece tool.

In forming armored fiber optic assemblies 20, extrusion material (not shown) flows through the material channel 380 and out of the material channel output end 382. At the same time, the fiber optic assembly 80 is fed through the profile tube interior 363 and out of profile tube output end 364 (and thus through the tip 348 and the die 378). In the meantime, the profile tube 360 is rotated via the gear 374 so that profiling feature 370 redirects (i.e., shapes) the flow of the extrusion material as it flows about fiber the optic assembly 80. As the fiber optic assembly 80 moves through the profile tube output end 364, the circular motion of the profiling feature 370 diverts the flow of extrusion material. The combined motion of the profiling feature 370 and the linear motion of fiber optic assembly 80 forms the armored profile. The speed at which profile tube 360 rotates relative to the motion of fiber optic assembly 80 (which may also be rotating) dictates the pitch of the armor profile. All other factors being equal, a higher rotational speed for the profiling feature 370 results in a shorter pitch for the armor profile. The size and shape characteristics of the profiling feature 370 dictate, at least in part, the particular armor profile imparted to the outer surface 52 of the dielectric armor 50. Though the extrusion flow is primarily diverted on the interior of the armor, the drawdown of the material moves the groove partially or completely to the outer surface of the armor. Of course, this type of extrusion set-up may be used on any desired layer of the dielectric armor.

Figure 11:
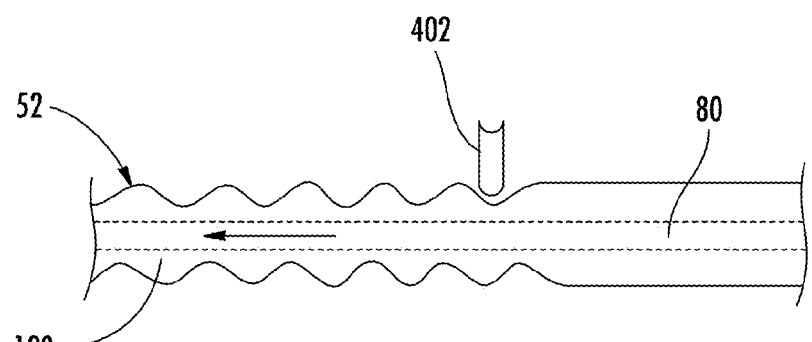
FIG. 11 is a schematic side view illustrating another method of forming dielectric armor.

Additionally, there are other suitable methods for forming the armor profile. By way of example, FIG. 11 schematically illustrates the dielectric armor 50 initially being extruded as a smooth-surfaced tube (i.e., having a smooth outer surface as shown on the right side). Thereafter, the armor profile of the outer surface 52 is then formed in the smooth-surfaced tube, prior to hardening, by the application (e.g., pressing) of a deforming member 402 (e.g., a nub or a finger) into the layer so as to shape outer surface 52 in a manner similar to that used in a lathe. In this example, the deforming member 402 may simply divert material from the web to the band, or it may remove material entirely from the dielectric armor 50. In one example embodiment, the deforming member 402 is stationary and the assembly 20 is rotated, while in another example embodiment, the deforming member 402 rotates around the dielectric armor 50 as it advances axially. In still another example embodiment, both the dielectric armor 50 and the deforming member 402 rotate. The deforming member 402 may also be integrated into the extrusion tooling (die).

Figure 12:
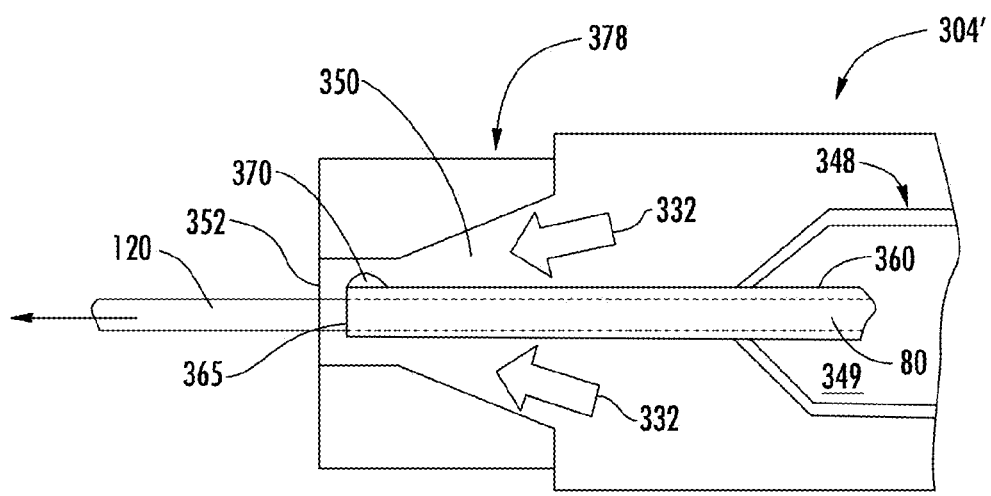
FIG. 12 is a partial, cross-sectional view of another explanatory example of a crosshead wherein the profiling feature is within the crosshead die.

FIG. 12 is a close-up, schematic cross-sectional view of another explanatory embodiment of crosshead 304' similar to that shown in FIG. 10. In FIG. 12, the tip 348 and the die 378 are configured so that central channel 350 is combined with the material channel through which the extrusion material flows. A portion of the profile tube 360 resides in an interior region 349 of the tip 348, while the proximal end portion of the profile tube resides within the channel 350 so that the profiling feature 370 resides within central channel 350 adjacent to the channel output end 352. This geometry confines the extrusion material 332 within the die 378 while allowing for control of the flow of extrusion material.

Figure 13:
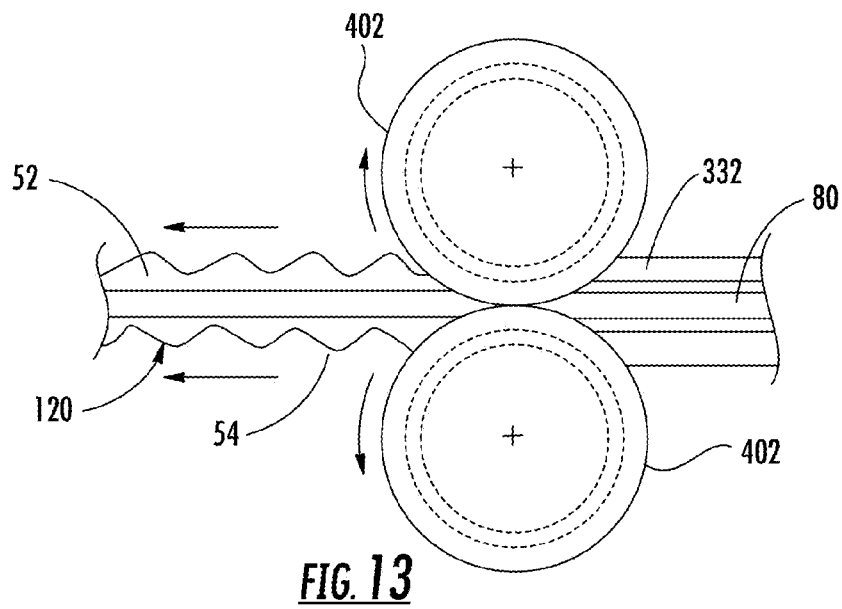
FIG. 13 is a side view of an example extrusion system wherein the profiling feature is located external to the crosshead and impresses the profile into the dielectric armor.
Figure 14:
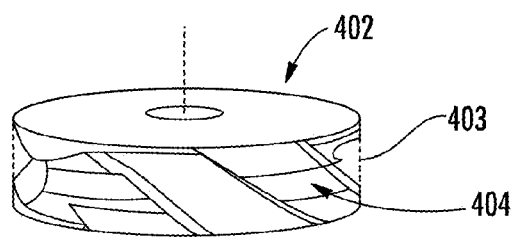
FIG. 14 is a perspective view of an example roller-type deforming member that is used to impress the armor profile into the dielectric armor.

In another explanatory embodiment similar to that shown in FIG. 11 and as illustrated in FIGS. 13 and 14, the dielectric armor is initially extruded as a smooth-surfaced tube (i.e., having a smooth outer surface on the right side) of dielectric extrusion material 332. The armor profile of the outer surface 52 is then formed prior to hardening, by the application (e.g., pressing) of a deforming member 402 (e.g., a set of gears) having one or more features 404 that press into the dielectric armor in order to shape the outer surface 52. FIG. 14 shows a perspective view of an exemplary embodiment of a roller-type deforming member 402 having an outer edge 403 in which features 404 are formed. In this embodiment, the deforming member 402 of FIG. 13 may be formed in sets of two, three, four, or more for forming the desired armor profile. The roller-type deforming member 404 rolls over the outer surface 52 of the dielectric armor before it hardens to impress features 404 of the armor profile.

Figure 15:
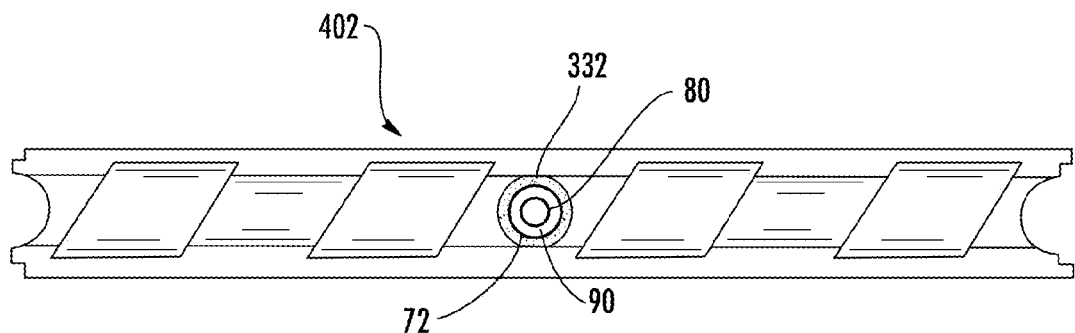
FIG. 15 is a front view illustrating the use of two roller-type deforming members to impress the armor profile into the dielectric armor.

The deforming member 402 may press extrusion material 332 against the fiber optic assembly 30 to eliminate free space 100. The deforming member 402 may also press against the dielectric armor 50 in a manner that maintains the desired amount of free space 100. FIG. 15 is a front view that illustrates the use of two roller-type deforming member to impress the desired armor profile into the dielectric armor.

It will be apparent to those skilled in the art that various modifications and variations can be made to the present invention without departing from the spirit and scope of the invention.

We claim:

1. An armored fiber optic assembly, comprising:
a fiber optic assembly having at least one optical fiber; and
armor comprising a polymer surrounding the fiber optic assembly, the armor having an armor profile with an outside diameter,
wherein when a 10 cm section of the fiber optic assembly is subjected to a crush load along a crush direction between opposing plates that reduces a crush dimension of the assembly from the outside diameter to about 60 percent of the outside diameter, a cable assembly recovers when the crush load is released so that the crush dimension increases to at least 70 percent of the outside diameter.

2. The armored fiber optic assembly of claim 1, wherein the at least one optical fiber comprises at least twelve optical fibers.

3. The armored fiber optic assembly of claim 1, wherein when the armor is subjected to a crush load along a crush direction that reduces the crush dimension of the assembly from the outside diameter to about 60 percent of the outside diameter, the cable assembly recovers so that the crush dimension increases to at least 74 percent of the outside diameter.

4. The armored fiber optic assembly of claim 1, wherein the armored fiber optic assembly has a median separation in the range of about 0.1-1.5 millimeters between the fiber optic assembly and an interior of the armor.

5. The armored fiber optic assembly of claim 1, wherein the armor comprises an inner layer and an outer layer.

6. The armored fiber optic assembly of claim 5, wherein the inner layer has a continuous annular cross-section.

7. The armored fiber optic assembly of claim 5, wherein the inner layer comprises a PVC.

8. The armored fiber optic assembly of claim 5, wherein the armored fiber optic assembly satisfies ICEA S-83-596-2001.

9. The armored fiber optic assembly of claim 5, wherein after the crush load is released, the at least one optical fiber has a delta attenuation due to the crush load of less than 0.4 decibels at 1550 nanometers.

10. The armored fiber optic assembly of claim 5, wherein the inner layer has a modulus of elasticity of about 1200 MPa or greater.

11. The armored fiber optic assembly of claim 5, wherein the armor has an outside diameter in the range of 8-15 millimeters.

12. The armored fiber optic assembly of claim 11, wherein the inner layer is a PVC and the outer layer is a PVC.

13. The armored fiber optic assembly of claim 1, wherein the armor profile has a pitch P between 5 millimeters and 30 millimeters and a groove length that is between 20 percent and 80 percent of the pitch P.

14. The armored fiber optic assembly of claim 13, wherein the armor comprises an inner layer with a Shore D hardness and an outer layer with a Shore D hardness that is lower than that of the inner layer.

15. An armored fiber optic assembly, comprising:
a fiber optic assembly having at least one optical fiber, an extruded polymer cable jacket, wherein the fiber optic assembly is a stranded tube cable; and
armor comprising a polymer surrounding the fiber optic assembly, the armor having an outer surface with an undulating geometry along its length,
wherein when a 10 cm section of the fiber optic assembly is subjected to a crush load along a crush direction between opposing plates that reduces a crush dimension of the assembly from the outside diameter to about 60 percent of the outside diameter, a cable assembly recovers when the crush load is released so that the crush dimension increases to at least 70 percent of the outside diameter.

16. The armored fiber optic assembly of claim 15, wherein after the crush load is released, the at least one optical fiber has a delta attenuation due to the crush load of less than 0.4 decibels at 1550 nanometers.

17. The armored fiber optic assembly of claim 15, wherein the armor has a layer having a modulus of elasticity of about 1200 MPa or greater.

18. The armored fiber optic assembly of claim 15, wherein the armor has an outside diameter in the range of 8-15 millimeters.

19. An armored fiber optic assembly, comprising:
a fiber optic assembly having at least one optical fiber, an extruded polymer cable jacket, wherein the fiber optic assembly is a stranded tube cable; and
a dielectric armor surrounding the fiber optic assembly, the dielectric armor having an outer surface with an undulating geometry along its length,
wherein when a 10 cm section of the fiber optic assembly is subjected to a crush load along a crush direction between opposing plates that reduces a crush dimension of the assembly from the outside diameter to about 60 percent of the outside diameter, a cable assembly recovers when the crush load is released so that the crush dimension increases to at least 70 percent of the outside diameter.

20. The armored fiber optic assembly of claim 19, wherein the armored fiber optic assembly has a median separation in the range of about 0.1-1.5 millimeters between the fiber optic assembly and an interior of the dielectric armor.

* * * * *